United States Patent [19]

Itagaki

[11] 4,051,879
[45] Oct. 4, 1977

[54] APPARATUS FOR POURING LIQUID IN CUPS

[75] Inventor: Katsunari Itagaki, Azuma, Japan

[73] Assignee: Sankyo Electric Company Limited, Isesaki, Japan

[21] Appl. No.: 696,393

[22] Filed: June 15, 1976

[51] Int. Cl.[2] .............................................. B65B 3/34
[52] U.S. Cl. ................................ 141/329; 99/302 R; 426/113; 426/402
[58] Field of Search ............ 99/282, 283, 295, 302 R, 99/357; 141/1, 11, 19, 82, 98, 329; 222/83, 83.5, 86; 426/394, 113, 402, 403

[56] References Cited

U.S. PATENT DOCUMENTS

| | | | |
|---|---|---|---|
| 2,939,381 | 6/1960 | McBride | 141/329 X |
| 3,139,343 | 6/1964 | Baselt | 222/86 X |
| 3,847,162 | 11/1974 | Seil | 141/329 X |

Primary Examiner—Richard E. Aegerter
Assistant Examiner—Frederick R. Schmidt
Attorney, Agent, or Firm—John M. Calimafde; Francis J. Murphy

[57] ABSTRACT

Apparatus for perforating a cover of a top covered cup and pouring a liquid in a predetermined quantity into the cup comprising a perforating tubular member and a liquid pipe which is controlled by a solenoid valve. The perforating tubular member is disposed over a predetermined position where the cup should is to be placed so that the tube vertically extends over and is movable downwardly to perforate the cover of the cup by a sharpened lower end thereof. The perforating member is vertically reciprocated by a driving means which is started by the operation of a switch and is stopped by a second detecting means which detects a time when the perforating member has been restored to its rest position. The output port of the liquid pipe is also disposed over the position where the cup should be placed and is mounted within the perforating tubular member. A first detecting means is provided which detect a time when the perforating member arrives a predetermined position after perforation. A timer is operated by an output signal fo the first detecting means and provides an output to the solenoid valve. Thus, a liquid in a predetermined quantity is poured into a cup through a hole formed in the cover of the cup by the perforating tubular member cup.

7 Claims, 10 Drawing Figures

APPARATUS FOR POURING LIQUID IN CUPS

BACKGROUND OF THE INVENTION

This invention relates to apparatus for pouring liquid into cups and, in particular to such apparatus which is provided with a perforating device for perforating a top cover of a top covered cup whereby the liquid may be poured into the cup through a hole in the top cover which is formed by the perforating device.

Recently, processed and dried foodstuffs, or instant meals, contained in cups have been produced and commercially sold which are readily cooked merely by pouring boiled water thereon, followed if necessary by mixing. For example, processed foods, such as processed and dried noodles, rices, curry and rice, stew and so on which are contained in cups, have been commercially sold.

In selling cups containing such processed foodstuffs (which will be referred as "cup-foods" hereinafter), automatic vending machines may be employed. But if the employed machine is one having only a vending function without any provision for feeding boiled water into the cup, a purchaser of the cup-foods cannot eat it instantly.

A vending machine has been also used for selling cup-foods, which is provided with a cooking apparatus, by which a purchaser can instantly cook a purchased cup-food by the use of the cooking apparatus and eat it.

Such cooking apparatus comprises a cooking chamber with a door, a source of hot water, or boiled water, and a feeding device, for the water, all of which are arranged in a housing of the vending machine.

The purchaser opens the door of the cooking chamber to put the cup-food into the chamber, and then closes the door. Thereafter, he pushes a cooking button which controls the feeding device to supply single cup quantities of boiled water. Thus boiled water is poured into the cup within the cooking chamber to cook the cup-food.

In the prior art, the purchaser must tear off the cover of the cup before placing it into the cooking chamber in order to permit the boiled water to be poured into the cup. This can annoy the purchaser. Moreover, the boiled water is then exposed to the atmosphere in the cooking chamber causing it to decrease in temperature so that the foods in the cup may not be cooked adequately.

SUMMARY OF THE INVENTION

It is, therefore, an object of this invention to provide apparatus for pouring liquid into cups wherein the liquid can be poured into a top covered cup when the top covered cup is placed in the apparatus without tearing off the cover. This apparatus may be used with the cooking apparatus of a vending machine.

Another object of this invention is to provide such apparatus wherein boiled water is fed into the cup with little exposure to the atmosphere.

This invention provides an apparatus for automatically perforating a top cover of a cup and pouring a liquid in a predetermined quantity into the cup. The apparatus comprises a platform on which the cup is to be placed, a tubular member with a sharply cut end which is vertically disposed over the platform and movable in vertical direction with the sharply cut end facing the platform. Means are provided for driving the tubular member reciprocally in a vertical lane over the platform with a sufficient stroke such that said sharply cut end perforates the top cover of the cup which is placed on the platform. A liquid pipe conducts a liquid from a liquid source. An output port of the liquid pipe is disposed within the tubular member. Valve means are provided to control a liquid discharge from said output port of said liquid pipe. Means are provided for releasing the valve means which controls the discharge of liquid from said output port of said liquid pipe. Timer means are provided for operating the valve releasing means during a predetermined time period to discharge the liquid in predetermined quantities first detector means are provided for detecting that the tubular member is at a predetermined position within the vertical reciprocating stroke, to activate the timer means. Second detector means are provided for stopping the operation of the driving means at a time when said tubular member is at a predetermined rest position of the vertical reciprocating stroke. Means are also provided for deactivating the second detector means.

According to one embodiment of this invention, an apparatus for automatically perforating the top cover of a cup and pouring a liquid in predetermined quantity into the cup, includes a platform on which the cup is to be placed, a tubular member with a sharply cut end which has its longitudinal axis vertically disposed over the platform and is movable in a vertical direction with said sharply cut end facing the platform, an electric motor, a longitudinal member which is coupled with the tubular member and which is moved by the electric motor reciprocally in a vertical direction with a sufficient stroke that the sharply cut end of the tubular member perforates the top cover of a cup which is placed on the platform. A liquid pipe to conduct a liquid from a liquid source has an output port which is disposed within the tubular member. A solenoid valve is provided to control the liquid discharge from the output port of the liquid pipe. An electric power is provided with timer means which are connected to the electric power source and operate during a preset time period after a starting signal is received. An output of the timer means is connected to the solenoid valve so that the liquid discharges from said output port during the operation of the timer means. A first microswitch detects that the longitudinal member is at a predetermined position of its vertical reciprocating stroke, and generates the starting signal to the timer means. A second microswitch is connected between the electric motor and the power source and is turned off when the longitudinal member is at a predetermined rest position of its vertical reciprocating stroke. A push button switch is connected in parallel with the second microswitch.

Further objects, features and aspects of this invention will be understood from following description in connection with the embodiments of this invention which are described referring to the annexed drawings.

DETAILED DESCRIPTION OF PREFERRED EMBODIMENTS

Figure 1:
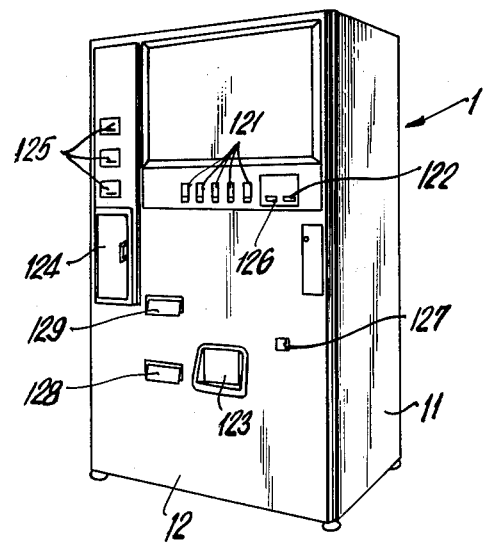
FIG. 1 is a perspective view of an example of a vending machine to which this invention is applicable.

Referring to FIG. 1 which shows a perspective view of an example of a vending machine to which this invention is applicable, the vending machine 1 comprises a housing 11 and a front door 12 of the housing. The front door 12 is pivotally fixed to the housing 11 at one end and is locked to the housing at the opposite end, so that the door 12 may be selectively opened by releasing the lock.

On the front door 12, goods selection buttons 121 (five buttons are shown), a coin deposit opening 122, a goods dispensing opening 123, a door 124 for accessing a cooking chamber, cook selection buttons 125 (three buttons are shown), a coin return lever 126, a coin return opening 127, a spoon dispenser opening 128, and a fork dispenser opening 129 are provided, as shown in the drawing.

The number of goods selection buttons 121, and the number of cook selection buttons 125 may be varied accordingly to kinds of goods to be sold in the machine.

Moreover the spoon dispenser opening 128 and the fork dispenser opening 129 are provided accordingly to the kind of goods to be sold in the machine.

Figure 2:
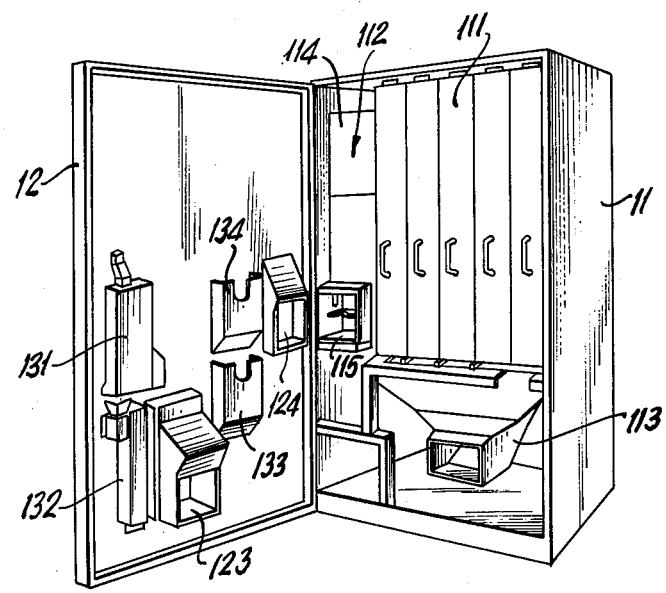
FIG. 2 is a perspective view of the vending machine in FIG. 1, with a door of a machine housing being open.

Referring to FIG. 2 which shows a perspective view of the vending machine 1 with the front door 12 being open, shelf units 111 (five units are shown) for containing goods therein, a cooking apparatus 112 and a goods discharge guide 113 are mounted within the housing 11.

The cooking apparatus 112 comprises a hot or boiled water feeding device 114, a cooking chamber 115 and other mechanisms which will be described hereinafter.

On the rear side of the front door 12, a coin detecting mechanism 131, a coin containing box 132, a spoon containing box 133, and a fork containing box 134 are mounted.

Referring to FIGS. 1 and 2, when a purchaser deposits a coin or coins into the coin deposit opening 122 and, then pushes a goods selection button 121, one goods, or a cup-food, is discharged to the goods discharge guide 113 from a corresponding shelf unit 111 by means of a control circuit and a goods discharging mechanism (which are not shown). Thus, the purchaser can obtain a desired cup-food from the goods take-out opening 123 which communicates with the goods discharge guide 113.

Figure 3:
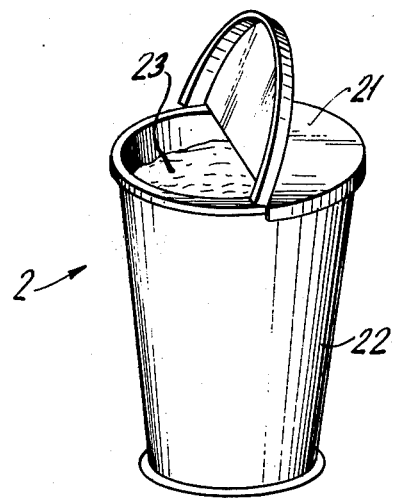
FIG. 3 is a perspective view of a cup-food which is sold in the vending machine in FIG. 1, with a top cover being torn off, FIG. 4 schematically shows a perspective view of an embodiment of this invention.

In known apparatus, the purchaser takes off or tears off a cover 21 of the cup-food 2, as shown in FIG. 3, and, then, puts it into the cooking chamber 115 after opening the door 124. Then he pushes a corresponding cook selection button 125. Boiled water is then fed into the cup 22 and poured onto the food 23 in the cup 22 from the hot water feeding device 114. The purchaser can eat the cup-food by the use of spoon or a fork which is obtained through a corresponding opening 128 or 129.

It is troublesome for purchasers to tear off the cover of the cup. Furthermore, because boiled water is poured into the cup through a large aperture after the cover is torn off, the water is exposed to the atmosphere decreasing its temperature.

These disadvantages are overcome by this invention.

Figure 4:
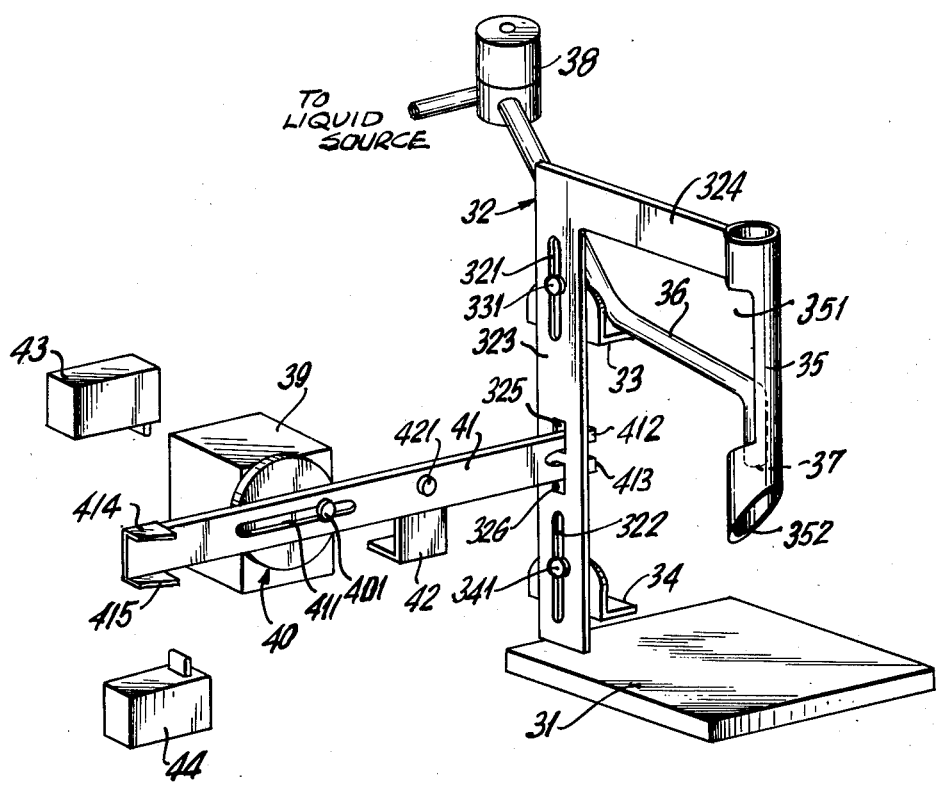
Figure 5:
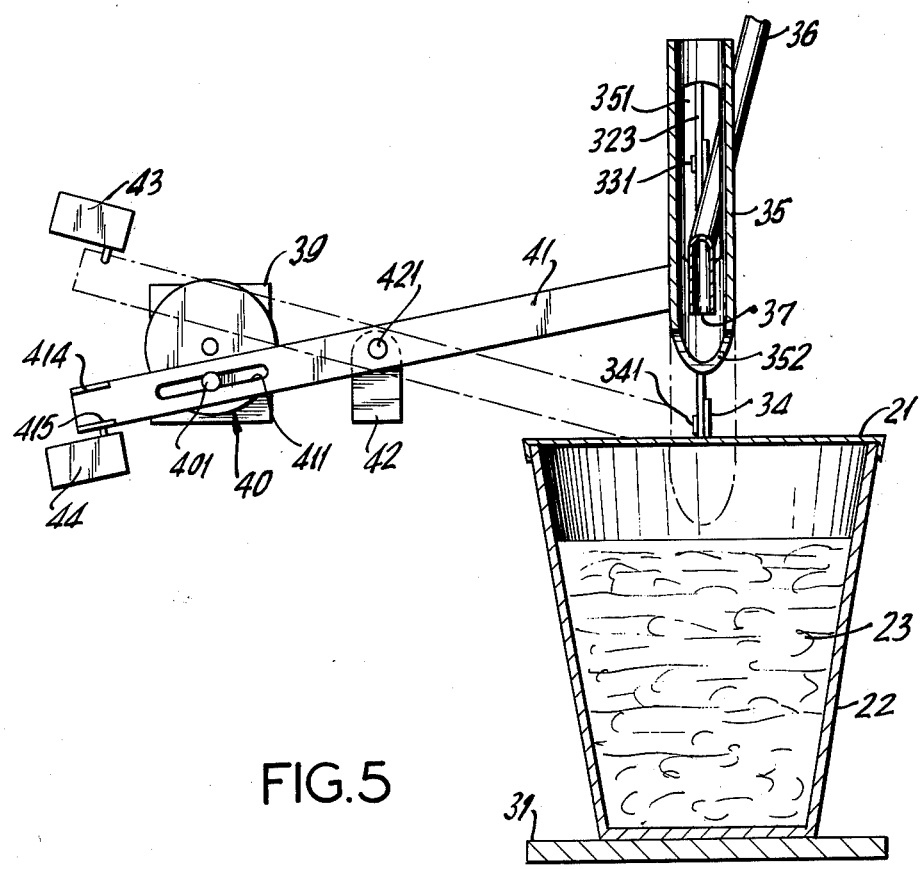
FIG. 5 shows a sectional view of the embodiment in FIG. 4, with a cup-food being also shown.

Referring to FIGS. 4 and 5, an embodiment of this invention comprises a platform 31 on which a top covered cup should be placed.

An L-shaped member 32 is mounted slidably in vertical direction on two supports 33 and 34 by engaging two slots 321 and 322 formed in a vertical leg portion 323 with pins 331 and 341 fixed to supports 33 and 34 respectively. Supports 33 and 34 are mounted on a machine frame (not shown).

A tubular member 35 is fixed to a free end of a cantilever arm 324 of the L-shaped member in such manner that the tubular member 35 extends in a vertical direction and is movable in a vertical direction over the platform 31.

The tubular member 35 is provided with a longitudinally extending slot 351, through which slot a liquid pipe 36 is introduced within the tubular member 35 so that a discharge port 37 of the liquid pipe 36 is disposed within the tubular member.

The liquid pipe 36 is mounted on a machine frame (not shown) so that the pipe 36 and the discharge port 37 are fixed in position and are not movable. A solenoid valve 38, or alternatively an electromagnetic valve, is connected to the liquid pipe 36 to control the discharge of liquid from the discharge port 37. The liquid pipe 36 is connected to a liquid source or a tank (not shown).

The tubular member 35 has a sharply cut end 352 at a lower end thereof to perforate the top cover 21 of the cup 22 which is placed on the platform 31.

A driver for reciprocally moving the L-shaped member in a vertical direction comprises an electric motor 39, a crank (which is shown in a disk crank form in the drawings) 40 and a rotatable lever member 41.

The crank 40 is coupled with an output shaft of the electric motor 39 to be rotated by the motor in a vertical plane.

The lever member 41 is pivotally mounted on a support 42 by a pivot 421 at an intermediate portion thereof, so that the lever member 41 is rotatable around the pivot 421.

One end portion of the lever member 41 is engaged with a crank pin 401 by a longitudinally extending slot 411 formed in the lever member, so that the lever member 41 is rotationally and reciprocally moved around the pivot 421 in a vertical plane by the rotation of the motor 39.

The other end of the lever member 41 is biforcated to form two projections 412 and 413, which are, in turn, inserted into apertures 325 and 326 formed in the vertical leg portion 323 of the L-shaped member 32, so that the L-shaped member 32 is connected with the lever member 41 to be reciprocatingly moved in a vertical direction by the rotation of the electric motor 39.

The lever member 41 is provided with two projections or actuators 414 and 415 at the one end thereof, for actuating microswitches 43 and 44, respectively.

A first microswitch 43 is so disposed to engage with the actuator 414 and to be closed at a time when the outer end of the lever member 41 to which it is attached is at the highest position of the reciprocating vertical movement, or at a time when the tubular member 35 is at the lowest position of its reciprocating vertical stroke.

The second microswitch 44 is so disposed to engage with the other actuator 415 and to be opened at a time when the outer end of the lever member 41 is lowered to its lowest position, or at a time when the tubular member 35 is at the highest position of the reciprocating vertical stroke.

The first microswitch 43 provides a signal for starting the discharge of the liquid, or boiled water, from the discharge port 37, and the second microswitch 44 shuts off the electric motor 39.

The lower sharply cut end 352 of the tubular member 35 is so disposed that it is at a level higher then the top cover 21 of a cup 22 which is placed on the platform 31, at the highest position of the reciprocating vertical stroke of the tubular member 35, as shown in FIG. 5. The lower sharply cut end 352 must be disposed to be a level lower than that of the top cover 21 of the cup 22 on the platform at the lowest position of reciprocating vertical stroke of the tubular member 35, as shown by the imaginary lines in FIG. 5.

Figure 6:
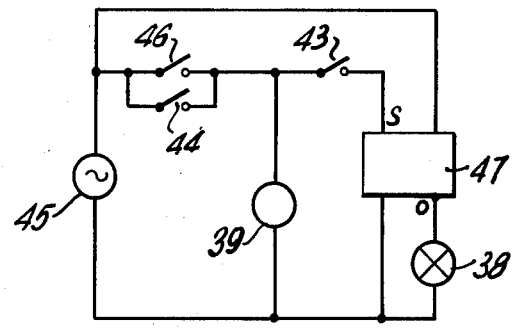
FIG. 6 is a circuit diagram of a control circuit of the embodiment in FIG. 4.

Referring to FIG. 6 which shows a control circuit for the embodiment shown in FIGS. 4 and 5, the control circuit comprises an electric power source 45. The motor 39 is connected with the power source 45 through the microswitch 44. A starting push button switch 46, which may, for example, be a cook selection button 125 in FIG. 1, is connected in parallel with the microswitch 44.

Therefore the motor 39 is rotated by pushing the starting push button switch 46 and continuously rotates because the actuator 415 moves away from the microswitch 44 to close the switch 44 and stops after one complete revolution because the microswitch 44 is again opened by contact with the actuator 415. Thus, once a starting push button switch 46 is operated, the tubular member 35 moves over one vertical reciprocating stroke.

A timer 47 is coupled with the power source 45. An output O of the timer 47 is connected to the solenoid valve 38. A starting signal input terminal S of the timer is connected to the second microswitch 44 through the first microswitch 43. As a result, when the first microswitch 43 is engaged by the actuator 414 and is closed, the timer 47 is started and operates during a predetermined, or preset time period to open the solenoid valve 38. Liquid will be discharged from the discharge port 37 during that predetermined time period. After the predetermined time period elapses, the timer 47 resets and the solenoid valve 38 is closed to stop the discharge of liquid from the port 37. In this way, a predetermined quantity of liquid can be fed from port 37.

In operation, when a purchaser puts a cup-food (2 in FIG. 3) on the platform 31 without tearing off the top cover 21 and pushes the push button swtich 46, the motor 39 starts to rotate and continuously rotates because the actuator 415 separates from the microswitch 44 closing it.

By the rotation of the motor 39, the tubular member 35 is lowered to perforate the top cover 21 of the cup 22.

When the tubular member 35 arrives at the lowest position of its vertical reciprocating stroke, the microswitch 43 is closed by actuator 414 to provide a starting signal to the timer 47. The solenoid valve 38 is thereby opened to discharge liquid from the discharge port 37 during the operation of the timer 47.

The liquid discharged from the port 37 is poured into the cup 22 through a hole in the top cover 21 which has been perforated by the sharply cut end 352 of the tubular member 35.

By further rotation of the motor 39, the tubular member 35 is raised up. When the tubular member 35 is restored to its original rest position, or the highest position of the vertical stroke, the microswitch 44 is again engaged by the actuator 415 and is opened. A result, the motor 39 stops.

The discharge of liquid from the discharge port 37 is stopped when the operation of the timer 47 stops since valve 38 is closed.

Thus, a predetermined quantity of the liquid, or boiled water is poured into the cup 22, so that the purchaser can eat the foods 23 in the cup.

In this embodiment, one is not required to tear off the cover of the top covered cup before putting it into the liquid pouring apparatus. Furthermore, because the discharged liquid or boiled water streams down through the tubular member 35 into the cup and because the hole for permitting the boiled water to be poured into the cup is small, the boiled water is exposed to the atmosphere very little so that the temperature of the boiled water does not decrease much.

Figure 7:
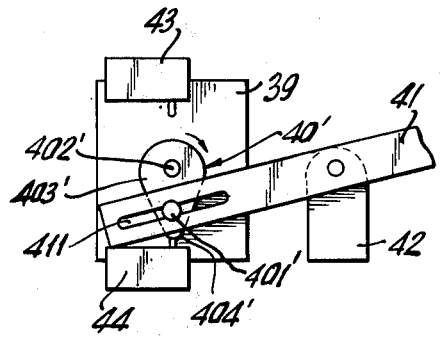
FIG. 7 is a front view of a main portion of a second embodiment.

Referring to FIG. 7, in which a second embodiment of the apparatus is shown, this embodiment is similar to the embodiment of FIG. 4 except for arrangement of the two microswitches 43 and 44. Accordingly, only the portion including the different arrangement is shown and similar parts are indicated by same reference numerals as were used in FIG. 4.

In the modification, the crank 40 is formed of an overhung crank 40' comprising a crank pin 401', a crank shaft 402' and a crank arm 403'. The crank pin 401' is connected to the lever 41 similarly as in FIG. 4, as shown in FIG. 7.

The crank arm 403' is provided with a cam contour 404' by which two microswitches 43 and 44 are controlled. Namely, the microswitch 43 engages with the cam contour 401' of the crank arm 403' to be closed one at a time when the tubular member 35 is at the lowest position of the vertical reciprocating stroke. The other microswitch 44 engages with the cam contour 401' to be opened at a time when the tubular member 35 is at the highest position of the vertical reciprocating stroke.

A control circuit similar to that shown in FIG. 6 may be employed to this modification.

Therefore, a similar operation is carried out in this modification, as in the embodiment in FIG. 4.

Figure 8:
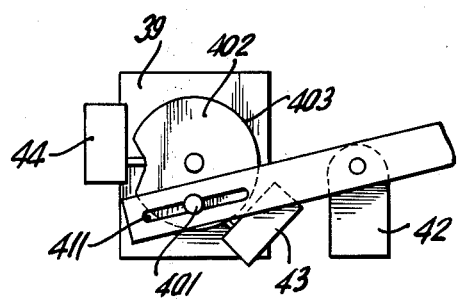
FIG. 8 is a front view of a main portion of a third embodiment.

FIG. 8 shows a second modification, in which only a main portion is shown for simplification of the drawing. Similar parts are indicated by same numerals as in FIG. 4.

In this modification, the disk 402 of the disk crank 40 is provided with a cam contour 403 around the circumference thereof. Two microswitches 43 and 44 are disposed to follow the cam contour. Therefore microswitches 43 and 44 are controlled by the cam contour.

A similar control circuit as in FIG. 6 is also employed in this modification.

In this modification, the microswitch 43 is disposed at an angular position spaced by more than 180° from then other microswitch 44. When push button 46 is depressed, motor 39 turns disk crank 402 and cam contour 403 comes into contact with and closes microswitch 44. When the depression in cam contour 403 reaches the contact of microswitch 43, that switch closes activating timer 47. Accordingly, the discharge of the liquid from the discharge port starts at a time when the tubular member is raised up to a predetermined vertical level after being lowered to the lowest position of the vertical reciprocating stroke.

The timer which is used in above described embodiments may be one of an electronic type in which the charging and discharging circuit of a capacitor is employed, or alternatively one of a mechanical type.

Figure 9:
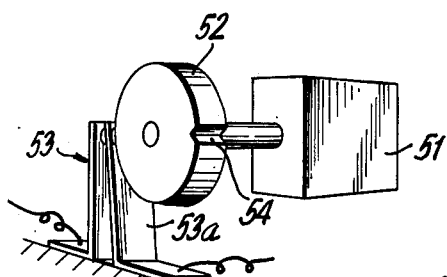
FIG. 9 shows the structure of an example of a timer which is used in this invention.

FIG. 9 shows an example of a mechanical timer, which comprises an electric motor 51, a cam 52 which is rotated by the motor 51 and a switch contact 53 the on-off operation of which is controlled by the cam 52.

A contact plate 53a of the switch contact 53 follows the cam 52, so that the switch contact 53 is opened at a time when the contact plate 53a engages with a depression 54 of the cam 52. When the contact plate 53a engages with the other cam surface, the switch contact 53 is closed.

The contact plate 53a engages with the depression 54 when the timer is not operated. Once the timer is started by energizing the motor 51, the switch contact 53 is maintained on during a time period required for a complete revolution of the cam and, thereafter, is turned off.

Accordingly, the operating time period of the timer is adjustable by adjusting the rotating rate of the cam 52.

Figure 10:
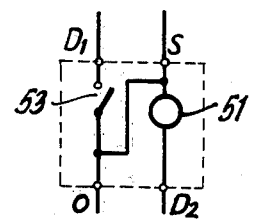
FIG. 10 shows the circuit of the timer in FIG. 9.

The switch contact 53 is connected with the motor 51 as shown in FIG. 10. The terminals indicated by $D_1$ and $D_2$ are connected to the electric power source. Another terminal S is a starting signal input terminal and the other terminal O is an output terminal.

This invention has been described in detail in connection with specific embodiments. But this invention is not restricted to such embodiments but various modifications are easily made by those skilled in the art and are within the scope of this invention. Moreover, it will be understood that this invention is applicable to not only described vending machines but also, generally, apparatus for automatically pouring liquid in top covered cups.

What is claimed is:

1. Apparatus for automatically perforating a cover of a container and pouring a predetermined quantity of liquid into said container including:
    means to support said container in a predetermined position;
    a movable tubular member having a longitudinal axis disposed substantially perpendicularly to said cover of said container when said container is in said predetermined position, said tubular member having a sharpened end disposed adjacent to said cover and an elongated longitudinal aperture;
    driving means to move said tubular member in a continuous reciprocating motion in the place of said axis with a stroke of sufficient length that said sharpened end of said tubular member perforates said cover of said cup;
    means to activate said driving means;
    a source of liquid;
    a fixedly mounted pipe having an input and an output end, said input end of said pipe being connected to said source of liquid and said pipe extending through said elongated aperture in said tubular member so that said output end is disposed within said tubular member;
    valve means to control the flow of liquid through said pipe;
    first detector means for detecting that said tubular member is at a first predetermined position perforating the cover of said container;
    timer means responsive to said first detector means to open said valve means for a predetermined period permitting the flow of liquid from the output end of said pipe;
    second detector means for detecting that said tubular member is at a second predetermined position spaced from the cover of said container; and
    means responsive to said second detector means to deactivate said driving means.

2. An apparatus for automatically perforating a top cover of a cup and pouring a liquid in a predetermined quantity into the cup;
    a platform on which the cup is to be placed;
    a movable tubular member having a sharpened end which tubular member has a longitudinal axis which is substantially orthogonally disposed over said platform and an elongated longitudinal aperture, said tubular member being movable in vertical place along said axis with said sharpened end facing said platform;
    an electric motor;
    connecting means connected between said electric motor and said tubular member to move said tubular member in a vertically reciprocating stroke with a sufficient amplitude that said sharpened end of said tubular member will perforate the top cover of a cup when the cup is placed on said platform;
    a liquid source;
    a fixedly mounted pipe which extends through said elongated aperture in said tubular member, said pipe having a first end connected to said liquid source and a second end disposed within said tubular member;
    a solenoid valve connected to said pipe to control the liquid flow from said source to said output end;
    an electric power source;
    a first microswitch disposed to detect that said tubular member is at a first predetermined position of the vertical reciprocating stroke perforating the cover of said cup, and to generate a first signal;
    a timer responsive to said first signal to operate during a predetermined time period, an output of said timer means being connected to said solenoid valve to open said valve to permit the discharge of liquid from said output end of said pipe during the operation of said timer means;
    a second microswitch connected between said electric motor and said power source, said second microswitch being disposed to be opened when said support member is at a second predetermined position of the vertical reciprocating stroke spaced from the cover of said cup and to thereby deactivate said motor; and
    switch means connected in parallel with said second microswitch to activate said motor.

3. The apparatus as claimed in claim 2, in which said electric motor includes an output shaft and said connecting means includes:
    a crank connected to said output shaft;
    a crank pin extending outwardly from said crank;
    a fixed support member;
    a movable support member connected to said tubular member; and
    a lever having a first and a second end, said lever being pivotally mounted on said fixed support member at a point between said first and second end, said lever being coupled to said crank pin at a point between said first end and said fixed support member and said second end being coupled to said movable support member.

4. The apparatus as claimed in claim 3, in which activator means are mounted on said lever adjacent to said first end and said first microswitch is disposed so that said first microswitch is engaged by said activator means and closed when said tubular member is at the lowest position of said vertical reciprocating stroke and said second microswitch is disposed so that said second microswitch is engaged by said activator and caused to open when said movable support member is at the highest position of the vertical reciprocating stroke.

5. The apparatus as claimed in claim 2, in which said connecting means includes cam means which are connected to and rotated by said electric motor means, and means connected between said cam means and said tubular member, which are responsive to the rotation of said cam means to move said tubular member in said vertically reciprocating stroke, said first and second microswitch means being disposed to be controlled by said cam means.

6. The apparatus as claimed in claim 5, in which said first microswitch is disposed to be closed by said cam means at a time when said tubular member is at the lowest position of the vertical reciprocating stroke, and said second microswitch is disposed to be opened by said cam means at a time when said tubular member is at the highest position of the vertical reciprocating stroke.

7. The apparatus as claimed in claim 5, in which said second microswitch is disposed to be opened by said cam means at a time when said tubular member is at the highest position of the vertical reciprocating stroke, and said first microswitch is disposed at a predetermined angular position spaced by more than 180° from said second microswitch in the rotational direction of said cam means, whereby the discharge of the liquid starts at a time when said tubular member rises to a predetermined level higher than the lowest position of the vertical reciprocating stroke after perforation.

* * * * *